United States Patent [19]

Siverhus et al.

[11] 4,015,259
[45] Mar. 29, 1977

[54] METHOD AND APPARATUS FOR INTERROGATING AND IDENTIFYING FIXED OR MOVING TARGETS

[75] Inventors: Ardell V. Siverhus, Neptune; Joseph A. Matava, Belmar; Dirk R. Klose, Eatontown, all of N.J.

[73] Assignee: The United States of America as represented by the Secretary of the Army, Washington, D.C.

[22] Filed: May 21, 1975

[21] Appl. No.: 579,658

[52] U.S. Cl. .......................................... 343/6.8 LC
[51] Int. Cl.² ........................................... G01S 9/56
[58] Field of Search ............................... 343/6.8 LC

[56] References Cited
UNITED STATES PATENTS

| | | | |
|---|---|---|---|
| 3,341,845 | 9/1967 | Deman | 343/6.8 LC X |
| 3,631,484 | 12/1971 | Augenbluk | 343/6.5 R |
| 3,718,926 | 2/1973 | Parker et al. | 343/6.8 LC |
| 3,721,906 | 3/1973 | Geesen et al. | 343/6.8 LC X |
| 3,754,250 | 8/1973 | Bruner | 343/6.8 R X |
| 3,914,762 | 10/1975 | Klensch | 343/6.8 LC X |

*Primary Examiner*—Malcolm F. Hubler
*Attorney, Agent, or Firm*—Nathan Edelberg; Robert P. Gibson; Daniel D. Sharp

[57] ABSTRACT

Hijacked vehicles, or the like, are identified by illuminating a transponder mounted to the vehicle by a beam of microwave energy, e.g., from a helicopter flying over the traffic. The transponder includes non-linear diodes which reradiate a signal back towards the helicopter. Means are disclosed for modulating the return signal with a 16-bit identification code, each bit of which is transmitted as a 31-bit pseudo-random code.

10 Claims, 3 Drawing Figures

METHOD AND APPARATUS FOR INTERROGATING AND IDENTIFYING FIXED OR MOVING TARGETS

GOVERNMENT LICENSE

The invention described herein may be manufactured and used by or for the Government, for governmental purposes, without the payment of any royalties thereon or therefor.

BACKGROUND OF THE INVENTION a. Field of the Invention

Broadly speaking, this invention relates to the interrogation and identification of fixed or moving targets. More particularly, in a preferred embodiment, this invention relates to methods and apparatus for interrogating moving vehicles by illuminating a transponder fastened to the vehicle with a beam of microwave energy.

b. Discussion of the Prior Art

In recent years commercial trucking firms have been subject to numerous hijackings. For example, in New York City along there is an average of about one hijacking a day. As a result of this and other problems, various state and federal authorities have begun to search for some reliable means for quickly determining when a hijacking has occurred so that police helicopters or the like may be dispatched to locate, and uniquely identify, the stolen vehicle in the dense traffic environment in which such hijackings typically occur.

Clearly, it would be highly advantageous if the stolen vehicle could be identified from the air, although interrogation from the ground would also be desirable. This requirement suggests the use of a transponder which would be placed on, or imbedded in, the roof of the truck or its trailer. Ideally, such a transponder would be inexpensive, tamper-proof, operable during the day or night and under all weather conditions, and have the capability of generating a coded response such that the interrogated vehicle could be uniquely and positively identified.

An article entitled "DINADE — A New Interrogation, Navigation and Detection System" which appeared in *Microwave Journal*, Vol. X, No. 6, May 1967 at pp 70, 72, 75, 77 and 78 discloses a technique wherein the vehicle to be identified is provided with a target comprising a plurality of serially connected diodes. When these diodes are illuminated by an interrogating beam of microwave energy at a fundamental frequency, $f_o$, the non-linear characteristics of the diodes cause the generation of harmonics of the fundamental frequency, which harmonics are then reradiated back towards, and detected by, the interrogator. By appropriately biasing the diodes, analog or digital information may be modulated onto the harmonic signal thus permitting the interrogator to uniquely identify the particular transponder radiating the harmonic signal.

Unfortunately, the modulation and coding scheme proposed in the above publication suffers from the disadvantage that it will be difficult to decide if the coded harmonic signal returned from the transponder is, in fact, the coded signal corresponding to the transponder on a stolen vehicle. This is due to the relatively unsophisticated coding technique proposed in the aforesaid article, which technique cannot successfully discriminate between the cluttered signals which would be received from the large number of transponders which, of necessity, must be expected in any dense urban area if the system is to be successful.

SUMMARY OF THE INVENTION

As a solution to this, and other problems, we have invented a transponder for use in an identification system of the type wherein an interrogating beam of microwave energy illuminates the transponder which is mounted to the object to be identified. The transponder includes at least one non-linear device which reradiates a signal back towards the source of the interrogating beam, which signal is harmonically related to the frequency of the interrogating beam. The novel aspect of the invention is that the transponder includes an apparatus for modulating the reradiated signal to uniquely identify the interrogated object. In a preferred embodiment this apparatus comprises means for generating an $m$-bit identification code and means, responsive to each bit in said $m$-bit code, for generating an $n$-bit pseudo-random code corresponding to the instantaneous logical value of the identification code. The transponder also includes means, responsive to the pseudo-random code generating means, for selectively biasing said at least one non-linear device so that said $m$-bit identification code is modulated onto the harmonic signal reradiated back towards the source of the interrogating beam.

The invention, and its mode of operation, will be more fully understood from the following detailed description, and the appended drawings, in which:

DETAILED DESCRIPTION OF THE INVENTION

Figure 1:
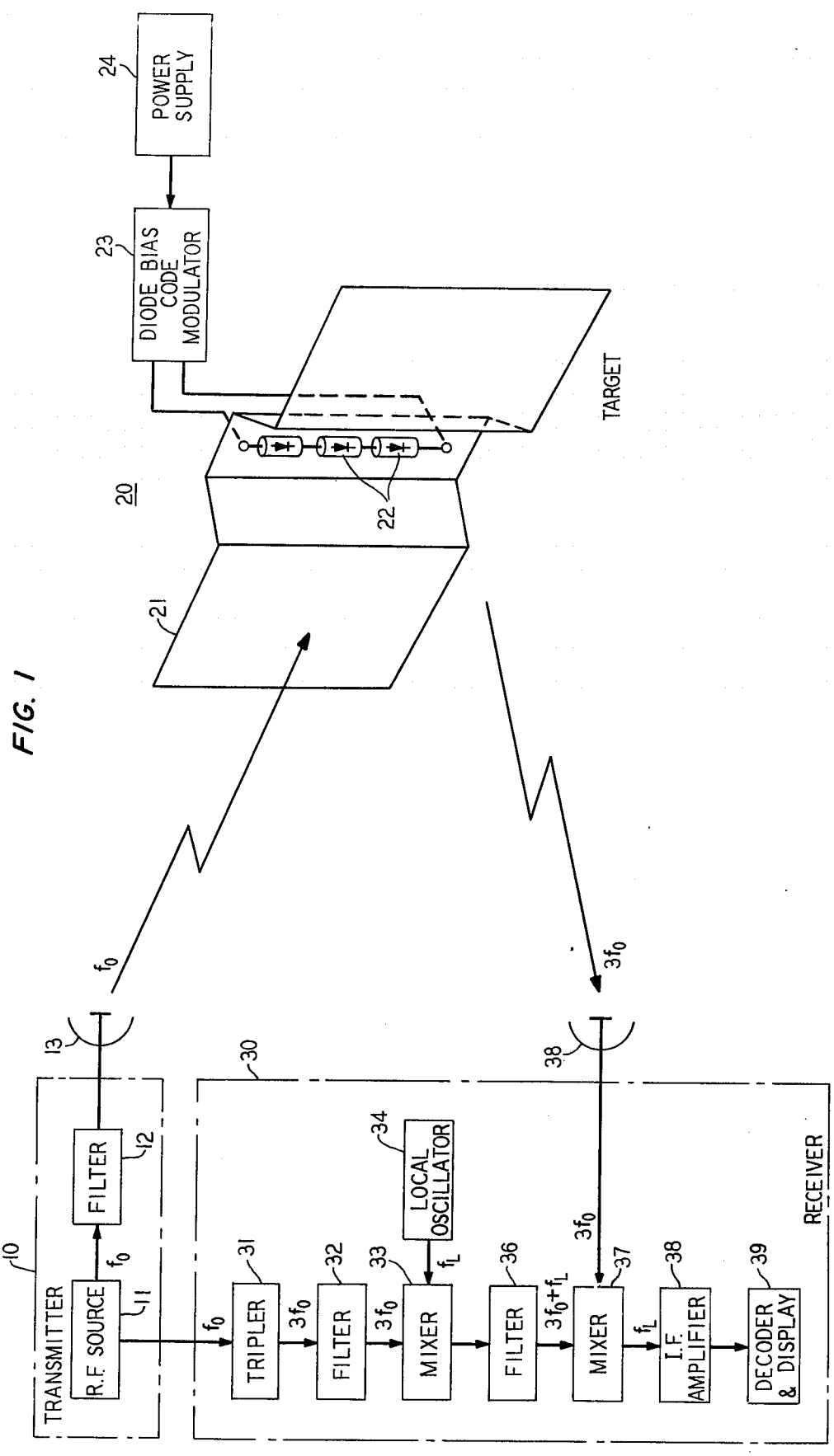
FIG. 1 is a partly schematic, partly diagrammatic drawing of an illustrative interrogation system according to the invention.

FIG. 1 depicts an illustrative embodiment of the invention. As shown, a transmitter 10 comprises an R.F. source 11 operating, for example, at a fundamental frequency of 3.1 GHZ. The output of source 11 is passed through a low-pass filter 12, thence to some suitable microwave antenna 13.

The beam from antenna 13 is focussed upon a transponder 20 which, as previously discussed, might be fastened to the roof of the vehicle sought to be identified. Transponder 20 comprises a metal plate 21 mounting a plurality of semiconductor diodes 22 which are serially connected to a code modulator 23 and a power supply 24.

Assume that the frequency of source 11 is $f_o$ and that diodes 22 are biased for conduction. Advantageously, low-pass filter 12 will suppress all harmonics of $f_o$ in the output signal, so that transponder 20 is illuminated by a pure beam of frequency $f_o$.

This beam will be received by plate 21, which acts as an antenna, and detected by diodes 22. However, due to the non-linear nature of the diodes, harmonics of the illuminating beam are generated and reradiated by plate 21 back towards the interrogating transmitter. In the illustrative embodiment of the invention described herein, it is the third harmonic, $3f_o$, which is of interest; however, it will be apparent to one skilled in the art that any harmonic of the illuminating beam could be employed with equal facility, bearing in mind that higher harmonics will have smaller amplitudes. Importantly, the returned harmonic, whatever its value, will be an exact multiple of, and completely coherent with, the fundamental frequency of the illuminating beam.

The receiver 30 comprises a frequency tripler stage 31 which is connected to transmitter 10 to receive a small portion of the output from R.F. source 11. In the illustrative embodiment, the output from tripler 31 will be at a frequency of 9.3 MHZ. This output is connected to a high-pass filter 32 which advantageously blocks the fundamental frequency $f_o$ and the second harmonic $2f_o$ but passes the desired third harmonic $3f_o$. The output from filter 32 is connected to one input of a mixer stage 33 which receives on its other input the output of a local oscillator 34 having a frequency $f_L$. The output of mixer 33, which comprises $f_3$ and $(f_3 \pm f_L)$ is then passed through a high-pass filter 36 which, for example, rejects all but the upper sideband $(3f_o + f_L)$. The output of filter 36 is connected to one input of a mixer stage 37 which receives on its other input the signal returned from transponder 20, via a suitable microwave antenna 38, which signal is, of course, the third harmonic $3f_o$. The output of mixer 37, which includes the IF frequency $f_L$, is then connected to an IF amplifier which is connected to the intput of a decoder and display stage 39. Decoder 39 decodes the modulations on the returned signal from transponder 20 for visual display to the operator.

The above discussion assumed that diodes 22 in transponder 20 were biased for conduction. Obviously, if the modulator 23 backbiases (i.e., grounds) the diodes so that they cannot conduct, no harmonic signal will be radiated by the transponder and the output of mixer 37 will be zero or, at best, some frequency falling well outside the bandpass of IF amplifier 38. Thus, if modulator 23 is arranged to selectively bias diodes 22 into conduction, a binary code may be superimposed on the harmonic signal reradiated back towards the interrogating transmitter. As will be explained in the illustrative embodiment of the invention, a 16-bit digital encoding scheme is employed to identify the transponder. This permits the tagging of $(2^{16} - 1) = 65,535$ separate transponders. Obviously, by increasing the length of the identification code, more vehicles may be tagged, albeit at a corresponding increase in the cost and complexity of both the transponder and receiver. As will be explained below, the decoder in receiver 30 employs matched filter detection to provide some 15db or so of processing gain. Thus, in the illustrative embodiment, each of the 16-bit positions in the identification code comprises a 31-bit pseudorandom binary word. The first bit in any 16-bit I.D. code is treated differently from the remaining 15 bits so that framing may be readily achieved in the receiver. For example, for the first bit position in any 16-bit I.D. code, a 31-bit binary word, known as Code A, is transmitted if the first bit is a logical 1 and a different 31-bit word, known as Code B, is transmitted if the first bit is a logical 0. In like fashion, for the remaining 15-bit positions, a 31-bit word, known as Code C, is transmitted for each logical 1 and a 31-bit word, known as Code D, for each logical 0.

Figure 2:
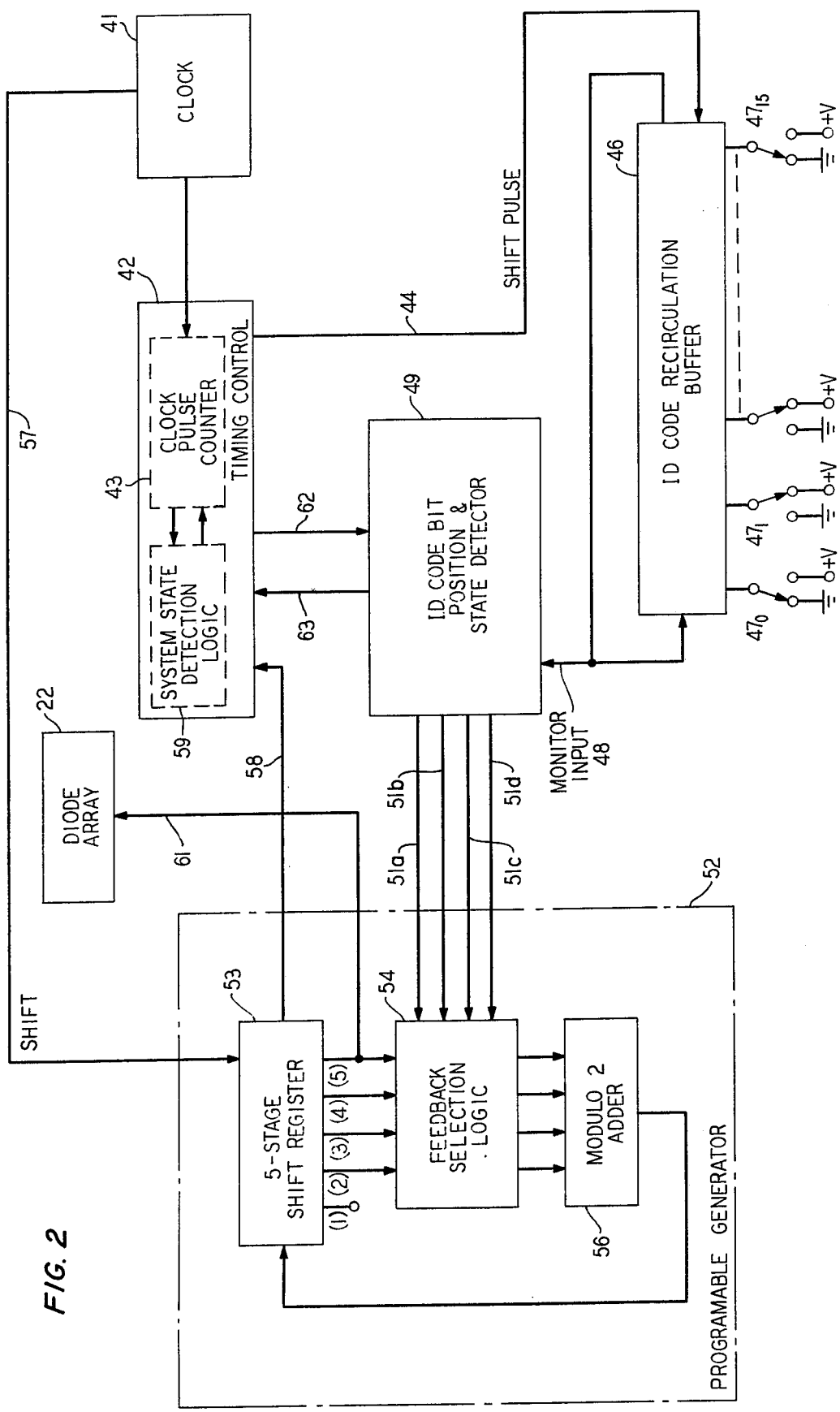
FIG. 2 is a schematic diagram of an illustrative modulator for the transponder shown in FIG. 1.

FIG. 2 depicts code modulator 23 in more detail. As shown, modulator 23 includes a clock 41 which may comprise, for example, a free-running, astable multivibrator operating at a rate of 32 KHZ. Clock 41 is connected to the input of a timing control stage 42 which includes a 31-stage counter 43. Counter 43 generates a shift pulse on a line 44 for every 31 clock pulses. Line 44 is connected to the shift input of a re-entrant, 16-stage serial output/parallel input shift register 46 which acts as an I.D. code recirculator buffer. The 16-bit I.D. code assigned to a particular transponder is determined by the settings of sixteen switches $47_0$–$47_{15}$, which connect the corresponding input lead of each stage in shift register 46 to either ground or + 6V, depending upon whether a logical 1 or 0 is to occupy that bit position in the I.D. code. If the I.D. code assigned to a particular transponder will never change, switches $47_0$–$47_{15}$ may be eliminated and the code hard-wired into the shift register. Thus, the 16-bit code assigned to a particular transponder will continuously circulate through buffer 46 under control of the clock pulses on lead 44.

The output of buffer 46 is also applied, via a lead 48, to the input of a bit position and bit state detector 49. Detector 49 comprises conventional logic circuitry to determine (a) if the bit currently in the last stage of buffer 46 is in the first bit of the 16-bit I.D. code stored therein and (2) whether the bit currently in the last stage of buffer 46 is a logical 1 or logical 0.

As previously discussed, there are four possible code combinations.

| Code | Bit Position | State |
|------|--------------|-------|
| A    | 1st          | "1"   |
| B    | 1st          | "0"   |
| C    | 2 – 16th     | "1"   |
| D    | 2 – 16th     | "0"   |

Thus, if detector 49 determines from the information presented to it via lead 48 that Code A should be transmitted, a signal is applied to a lead $51_A$. Similarly, if Codes B, C and D are to be transmitted, a signal is applied to leads $51_B$, $51_C$ and $51_D$, respectively.

As shown, leads $51_A$–$51_D$ are connected to a programmable sequence generator 52 which can generate a 31-bit maximum length sequence. Generator 52 includes a 5-stage serial input/parallel output shift register 53 having five output taps, four of which are connected, via a feedback selection logic circuit 54, to a modulo-2 adder 56, thence to the input of shift register 53. Shift register 53 is advanced at the rate of clock-pulses applied thereto over a lead 57. The output of shift register 53 is applied, via a lead 58, to a system state detection circuit 59 which forms part of timing control circuit 42.

If lead 51a is energized, that is if detector 49 determines that Code A is to be transmitted, feedback logic circuit 54 connects taps 2, 5, 3 and 4 of shift register 53 to adder 56. This will result in a first 31-bit word being generated by shift register 53 as the clock pulses on lead 57 advance the shift register 53. In like fashion, when lead 51b is energized for Code B, taps 2, 5, 1, 3 are connected to adder 56. Lead 51c energized will connect taps 2, 5, 1, 4 and lead 51d energized will connect taps 2 and 5 to adder 56.

A lead 61 connects the last tap of shift register 53 to diode array 22. Thus, depending upon which of leads 51a–51d are energized, shift register 53 will generate one of four different 31-bit (Pseudo Random) maximum length codes, which via lead 61, will cause diodes 22 to correspondingly reradiate a coded signal to the interrogating transmitter. At the end of each 31-bit code, shift register 53 pulses logic circuit 59 in control circuit 42, via lead 58, and logic circuit 59, in turn, advances the count in detector 49, via a lead 62. At the same time, detector 49 enables counter 43, via a lead 63, which then sends a clock pulse over lead 44 to advance the I.D. code in buffer 46 by one bit position. When the entire 16-bit I.D. code has been advanced through buffer 46 and 16, 31-bit, PN codes have been generated by generator 52, the first bit of the I.D. code will again be present in the last stage of buffer 46. This condition will again be sensed by detector 49, via the signal on lead 48, and the entire process will repeat itself. Thus, diodes 22 will continuously be modulated by a signal which is representative of the unique I.D. code stored in the buffer 46. In the illustrative embodiment of the invention, when diodes 22 are illuminated with an R.F. signal, they will reradiate a coded signal with an Amplitude modulation of approximately 30 db. Complete transmission of the I.D. code will occur in about 16 milliseconds.

Figure 3:
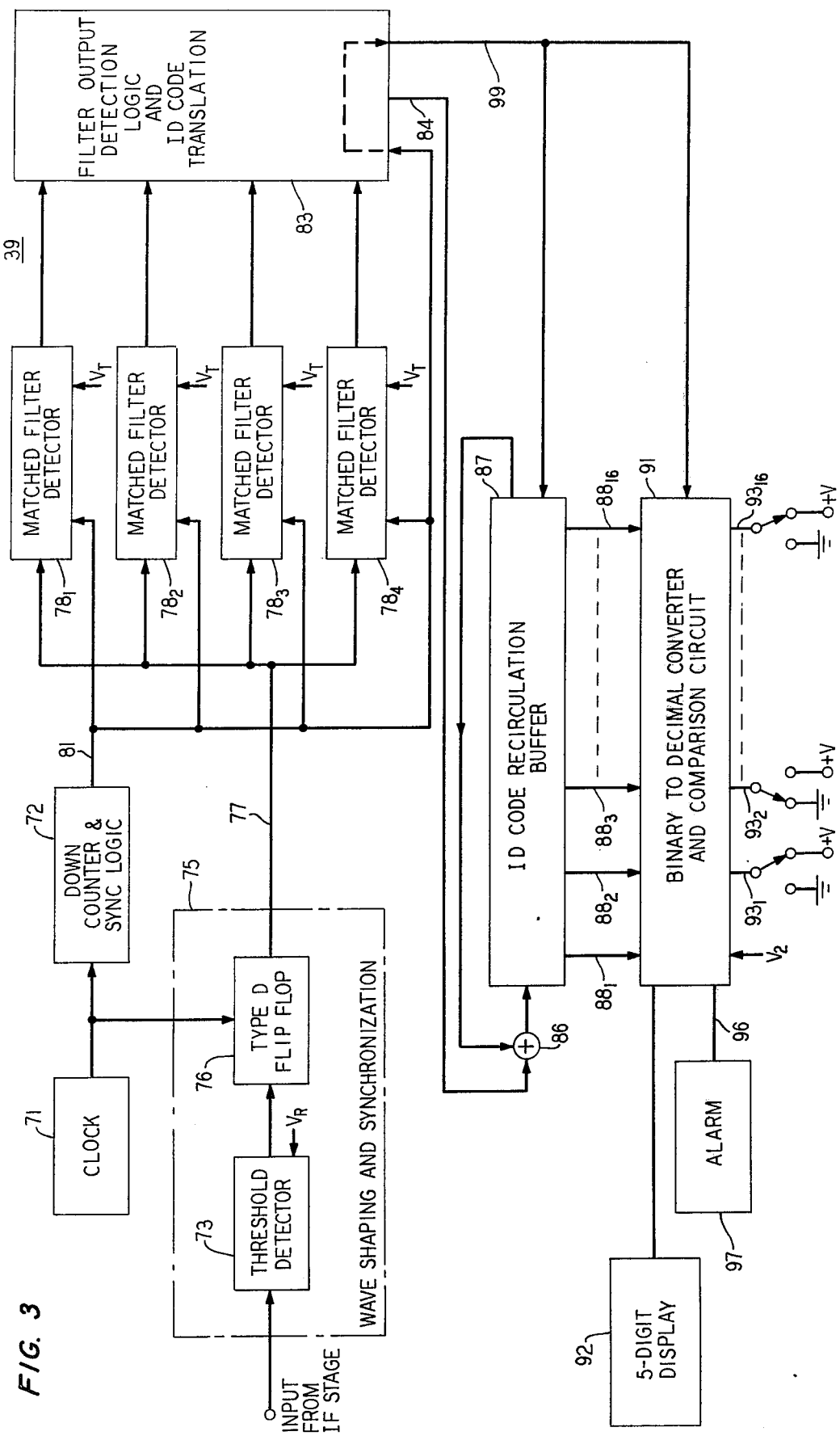
FIG. 3 is a schematic diagram of an illustrative code-demodulator for demodulating the signal reradiated by the transponder of FIGS. 1 and 2.

FIG. 3 depicts the decoder 39 in greater detail. As shown, a free-running clock circuit 71 generates a train of clock pulses at a rate of 256 KHZ, which is 8 times the 32 KHZ rate of the incoming code from the transponder. Clock 71 is connected to a divide-by-eight down-counter 72, the output of which, at 32 KHZ, serves as the basic clock rate for the remainder of the decoder. The output of IF amplifier 38 (FIG. 1) is connected to the input of a wave-shaping and synchronization circuit 75 which includes a threshold detector 73 connected to a type D flip-flop 76. Flip-flop 76 is also connected to the output of clock 71. The threshold of detector 73 is set by varying a potential $V_R$ and, when set to the appropriate level, detector 73 reproduces the incoming low-level I.D. code as a clean sequence of logical 1's and 0's, free from noise.

Flip-flop 76 synchronizes the regenerated I.D. waveform with clock 71. Since clock 71 runs at 8 times the rate of the incoming I.D. code, a variation of up to ⅛th the width of a single pulse is possible without losing sync. Because the clock in transponder 20 is subject to large temperature variations, due to its exposed location and the fact that there is relative motion between antennas 13 and 38 and the transponder, this approach to synchronization enables satisfactory decoding of the I.D. code under the most difficult conditions. The regenerated and synchronized I.D. code is next applied, via line 77, to the input of four matched filter detectors $78_1$–$78_4$ which are also connected, via line 81, to the output of sync divider 72.

Each matched filter detector actually comprises a 31-stage shift register. The output tap of each stage in the register is fed, either directly or after inversion, to a 31-input resistive mixing circuit. Thus, each of the matched filter detectors is pre-wired to recognize one of the four 31-bit PN codes (Codes A, B, C or D). Within each filter detector $78_1$–$78_4$, the output of the resistive circuit is compared with a threshold voltage $V_T$. Thus, if the input pattern to the resistive circuit matches the programmed pattern, the resistive circuit is fed with all logical 1's and the output of the resistive circuit is at a maximum. Any disagreement between the received code and the programmed code will reduce this voltage level. Thus, the comparator will give a logical 1 if the voltage output from the resistive circuit is greater than $V_T$ and a logical 0 if this voltage equals, or is less than, $V_T$. Therefore, by proper setting of the threshold voltage, recognition of a given transmission code is accomplished with either a certain percentage of error bits or with no acceptable error bits.

The recognition of a transmission code represents the detection of an I.D. code of either 1 or 0. If only 75% of the transmission code bits are required to be correct for acceptance, a bit error processing gain of approximate 10 db will result. That is, the bit reliability of the accept I.D. code is considerably higher than the bit error rate of the transmission code. Thus, depending on which of the four matched filters is activated, one knows if the received I.D. code bit is the first I.D. bit (of value 1 or 0) or any of the remaining 15 bits (of value 1 or 0).

The outputs of detectors $78_1$–$78_4$ are connected to a logic circuit 83 which, after a warm-up period in which I.D. digits are blocked until either a Code A or Code B bit is detected, feeds the 16-bit I.D. code, via a line 84, to an adder 86, thence to the input of a 16-stage serial input/parallel output shift register 87 which acts as a recirculating I.D. code buffer. The output of each stage of buffer 87, on leads $88_1$–$88_{16}$, is connected to a corresponding input of a comparison circuit and binary-to-decimal counter 91. Thus, as the 16-bit I.D. code is recirculated through buffer 87 it is decoded into a five-digit decimal number and displayed on a decimal display device 92 connected to buffer 91. A plurality of switches $93_1$–$93_{16}$, advantageously contacts on five decimal-coded, thumb-wheel switches, permit the operator to read into comparator 91 the I.D. code of the hijacked vehicle sought to be identified. Thus, if the 16-bit I.D. code currently stored in buffer 87 exactly matches the 16-bit I.D. code programmed into comparator 91 by the operator, a signal on a line 96 will sound on audible alarm 97 connected to the comparator. Synchronization for buffer 87 and comparison circuit 91 is provided, via line 99, from clock 72, via a gate in logic circuit 83.

Transponder 20 is shown in FIG. 1 as comprising a V-groove sheet of metal supporting three diodes. Obviously, there is a wide variation possible in the shape of the reflector and the number and type of diodes employed, particularly if frequencies other than 3.1 GHZ are used. One experimental transponder used comprised 6 inches × 12 inches V-groove sheet of 1/32 inch stainless steel supporting, in the groove, six IN23WE diodes.

Using a 100-watt CW amplifier at 3.1 GHZ, detection ranges in excess of 1,000 feet were attained using 20 db gain antennas. Using airborne equipment and 23 db gain antennas, the ground coverage is calculated to be an area 225 feet × 140 feet at an altitude of 1,000 feet.

Obviously, if I.D. codes which are larger or smaller than 16 bits are employed, or if each bit in the I.D. code is represented by a PN code of more or less than 31 bits, corresponding changes will have to be made in the sizes of the buffers, shift registers and matched filters employed in the transponder and receiver. Also, the clock frequencies will have to be altered to correspond to the new pulse rates. These changes are well within the scope of any qualified technician given the teachings of this specification. Likewise, one skilled in the art may make various changes and modifications to the arrangement of parts shown without departing from the spirit and scope of the invention.

The invention has been disclosed in the context of the identification of stolen or hijacked vehicles. Obviously, it is not so limited and could be used to identify freight cars on a railroad, airplanes approaching an airport, automobiles passing through a toll booth, etc.

What is claimed is:

1. An object identification system comprising:
a transponder mounted on an object to be identified;
means for interrogating said transponder with a beam of electromagnetic wave energy;
said transponder including at least one non-linear device having an conductive state and a non-conductive state and reradiating a signal back to the means for interrogating in response to impingement upon said device of energy from the means for interrogating, the frequency of said signal being harmonically related to the frequency of said wave energy;
means for modulating the harmonic signal reradiated back towards the interrogating means to identify uniquely the object on which said interrogating means is mounted, said modulating means including
means for generating a repetitive $m$-bit identification code;
means responsive to each bit of said $m$-bit code for generating an $n$-bit pseudo-random code sequence for said each bit corresponding to the instantaneous logical value and relative position of that bit of said identification code; and
means responsive to said pseudo-random code sequence generating means for selectively biasing said at least one non-linear device to either one or the other of said two states $m \times n$ times for each occurrence of said $m$-bit identification code.

2. An object identification system according to claim 1 wherein said repetitive identification code generating means includes an $m$-stage reentrant serial output parallel input shift register in which the unique $m$-bit identification code is stored and including a shift pulse clocked input for recirculating said code bits within said $m$-stage shift register one bit at a time.

3. An object identification system according to claim 2 further including means connected to each of the $m$ stages of said shift register for pre-selecting the logical value of each bit in said $m$-bit identification code.

4. An object identification system according to claim 1 wherein said $m$=16 and $n$=31.

5. An object identification system according to claim 1 including timing control means;
identification code bit position and state sensing means coupled to said timing control means and to said identification code generating means for tracking the position of the first bit of said identification code and for sensing the logical value of the particular identification code bit at the output of said identification code generating means;
said pseudo-random code sequence generating means being responsive to said identification code bit position and state sensing means for first generating either a first or a second $n$-bit pseudo-random code sequence depending upon the instantaneous logical value of said first identification code bit and then generating at least either a third or a fourth $n$-bit pseudo-random code sequence for each of the remaining bits in said $m$-bit identification code depending upon the instantaneous logical value for each of said remaining bits.

6. An object identification system according to claim 4 further including a clock operating at the identification code bit rate;
said identification code bit position and state sensing means having a distinct output line for each of said at least four pseudo-random code sequences to be generated and means for deriving a pseudo-random code sequence-determining output on the appropriate output line for the sensed code bit position and state;
said pseudo-random code sequence generating means including a shift register having $p$-output stages and a shift pulse input coupled to said clock, the final stage of said $p$-stage shift register being connected to said non-linear device, a modulo-2 adder having an output connected to the input of said $p$-stage shift register, and a feedback selection logic circuit responsive to the output on the corresponding one of said output lines and interposed between said $p$-stage shift register and said adder for selectively connecting predetermined ones of said $p$-output stages to said adder.

7. An object identification system according to claim 1 further comprising a decoder responsive to the received modulated harmonic signal reradiated from said transponder, said decoder comprising:
means for detecting said received modulated harmonic signal for providing a sequence of logic bits synchronized with said identification code bits;
at least four $n$-stage matched filter detectors unique to each of said pseudo-random code sequences and connected to said detecting means for detecting only that $n$-bit pseudo-random code sequence occurring during each given bit of said $m$-bit identification code;
recirculating storage means for sequentially storing the outputs of said matched filter detectors as successive bits of said $m$-bit identification code are received by said detecting means;
means for comparing the output of said storing means with the $m$-bit identification code for the transponder associated with the object sought to be identified; and
signalling means responsive to a match between the $m$-bit identification code generated in said recirculating storage means with the $m$-bit identification code for indicating to an operator that the desired object has been identified.

8. An object identification system according to claim 7 wherein said detecting means includes waveshaping means having a threshold detector; and wherein said detecting means further includes synchronizing means including a clock of clock rate greater than the pseudo-random code sequence rate, a bistable device having an input connected to the output of said threshold detector and a trigger input from said clock whereby said detected sequence of logic bits is synchronized with said clock.

9. An object identification system according to claim 7 wherein said matched filter detectors each provide a single logical pulse output indicative of the identification code bit position and logical value.

10. An object identification system according to claim 9 further including filter output detection logic and identification code translation means responsive to the output of a given one of said single logical pulse outputs for inserting the identification code bit into said recirculating storage means.

* * * * *